（12) United States Patent
Ichikawa et al.

(10) Patent No.: US 6,385,155 B1
(45) Date of Patent: *May 7, 2002

(54) POSITIONING SYSTEM FOR USE IN AN INFORMATION RECORDING/REPRODUCING APPARATUS

(75) Inventors: Yoshihiro Ichikawa; Masamitsu Ohkawara, both of Saitama-ken (JP)

(73) Assignee: Pioneer Electronic Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,687

(22) Filed: Mar. 15, 1999

(30) Foreign Application Priority Data

Mar. 19, 1998 (JP) .......................................... 10-071015

(51) Int. Cl.7 ........................... G11B 17/04; G11B 33/04
(52) U.S. Cl. ................. 369/77.2; 360/99.02; 360/99.06
(58) Field of Search .............................. 369/75.1–77.2; 360/99.02, 99.05, 99.06, 99.12

(56) References Cited

U.S. PATENT DOCUMENTS 4,772,973 A * 9/1988 Ohkita et al. ............ 360/99.06
4,802,040 A * 1/1989 Komatsu et al. ......... 360/78.04
4,887,174 A * 12/1989 Tezuka .................... 360/99.06
4,972,278 A * 11/1990 Hara et al. ................... 360/94
5,182,742 A * 1/1993 Ohmori et al. ............ 369/116
5,329,504 A * 7/1994 Mukawa ..................... 369/13
5,557,589 A * 9/1996 Mukawa et al. ............. 369/13

FOREIGN PATENT DOCUMENTS

JP         59-151367    *  8/1984
JP         4-318370       11/1992

* cited by examiner

Primary Examiner—William Klimowicz
(74) Attorney, Agent, or Firm—Arent Fox Kintner Plotkin & Kahn, PLLC (57) ABSTRACT

A positioning system is provided for use in an information recording/reproducing apparatus for positioning a cartridge containing an information recording medium on a chassis mounting information recording and reproducing structure. Such positioning system comprises positioning holes formed on the cartridge containing an information recording medium; and positioning pins formed on the chassis mounting information recording and reading structure. In particular, when a cartridge containing an information recording medium is inserted into the recording/reproducing apparatus, one of the positioning pins is caused to insert into a corresponding positioning hole earlier than the insertion of other pin(s) into other corresponding positioning hole(s).

7 Claims, 9 Drawing Sheets

PRESSING FORCE

POSITIONING SYSTEM FOR USE IN AN INFORMATION RECORDING/REPRODUCING APPARATUS

BACKGROUND OF THE INVENTION

The present invention relates to a positioning system, in particular to a positioning system for use in an information recording/reproducing apparatus such as a disc player, which positioning system is adapted to ensure a needed precision in positioning a disc cartridge within a disc player.

Usually, a recording medium such as an optical disc or a photomagnetic disc is housed in a rectangular cartridge so as to be protected from an outside environment.

A disc player for recording information on or reproducing information from an optical disc, uses a laser beam to effect such recording or reproducing. When such recording or reproducing is to be conducted, a shutter of the cartridge containing an optical disc is slide open so that the optical disc is partially exposed. Then, a laser beam from an optical pickup of the optical disc player is rendered to irradiate the exposed portion of the optical disc, thereby effecting a desired information recording or reproducing.

However, to ensure a correct information recording and reproducing, it is required that the above cartridge be loaded in a correct position within the disc player.

Figure 9:
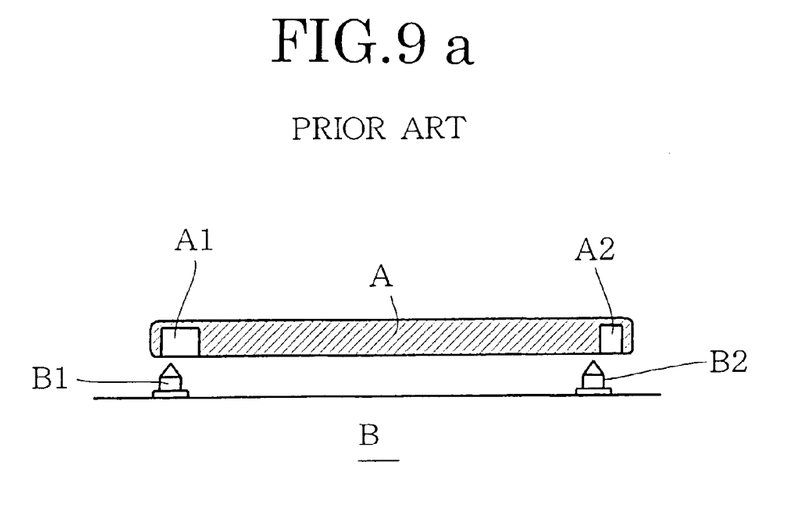
FIG. 9a is a cross sectional view schematically illustrating a loading operation for inserting a disc cartridge into a disc player employing a positioning system made according to a prior art.
FIG. 9b is a cross sectional view schematically indicating a problem in the loading operation for inserting a disc cartridge into a disc player employing a positioning system made according to a prior art.

FIGS. 9a and 9b are cross sectional views illustrating a conventional system for positioning a disc cartridge within a disc player. As shown in FIG. 9a, a plurality of positioning holes A1, A2 are formed on a disc cartridge A, a plurality of positioning pins B1, B2 are provided on the surface of a pivotable chassis B, in a manner such that the pins B1, B2 are allowed to insert into the positioning holes A1, A2, thereby rendering the cartridge A to be correctly positioned within the disc player.

Nevertheless, with such conventional positioning system, since the positioning pins B1, B2 are required to be simultaneously inserted into the positioning holes A1, A2, it is necessary that a deviation amount C for each positioning pin with respect to a corresponding positioning hole be controlled at half or less than half of the semi-diameter of the corresponding positioning hole.

Namely, if a deviation amount C for each positioning pin with respect to its corresponding positioning hole is more than half of the semi-diameter of the corresponding positioning hole, when a pressing force is exerted on the cartridge A against the chassis B, positioning pins B1, B2 may not be smoothly inserted into the positioning holes A1, A2, as shown in FIG. 9b.

As a result, a user has to be very careful in operating the disc player to ensure that the positioning pins B1, B2 may be correctly inserted into the corresponding positioning holes A1, A2, so as to have the disc cartridge A located at a correct position in the disc player.

SUMMARY OF THE INVENTION

It is an object of the present invention to provide an improved positioning system for use in a disc player, so as to produce an improved disc player easy to operate without having to be very careful when inserting a disc cartridge into the disc player, thereby solving the above-mentioned problem peculiar to the above-mentioned prior art.

According to the present invention, there is provided an improved positioning system for use in an information recording/reproducing apparatus for positioning a cartridge containing an information recording medium on a chassis mounting information recording and reproducing means. Such positioning system comprises a plurality of positioning holes formed on the cartridge containing an information recording medium; and a plurality of positioning pins formed on the chassis mounting information recording and reading means. In particular, when a cartridge containing an information recording medium is inserted into the recording/reproducing apparatus, one of the positioning pins is caused to insert into a corresponding positioning hole earlier than the insertion of other pin(s) into other corresponding positioning hole(s).

In one aspect of the present invention, said one of the positioning pins is larger in size than other positioning pin(s), and adapted to insert into said corresponding positioning hole which is also larger in size than other positioning hole(s).

In another aspect of the present invention, each of the positioning pins is formed into a taper or hemispherical shape.

The above objects and features of the present invention will become better understood from the following description with reference to the accompanying drawings.

DETAILED DESCRIPTION OF THE PREFERRED EMBODIMENTS

Figure 1:
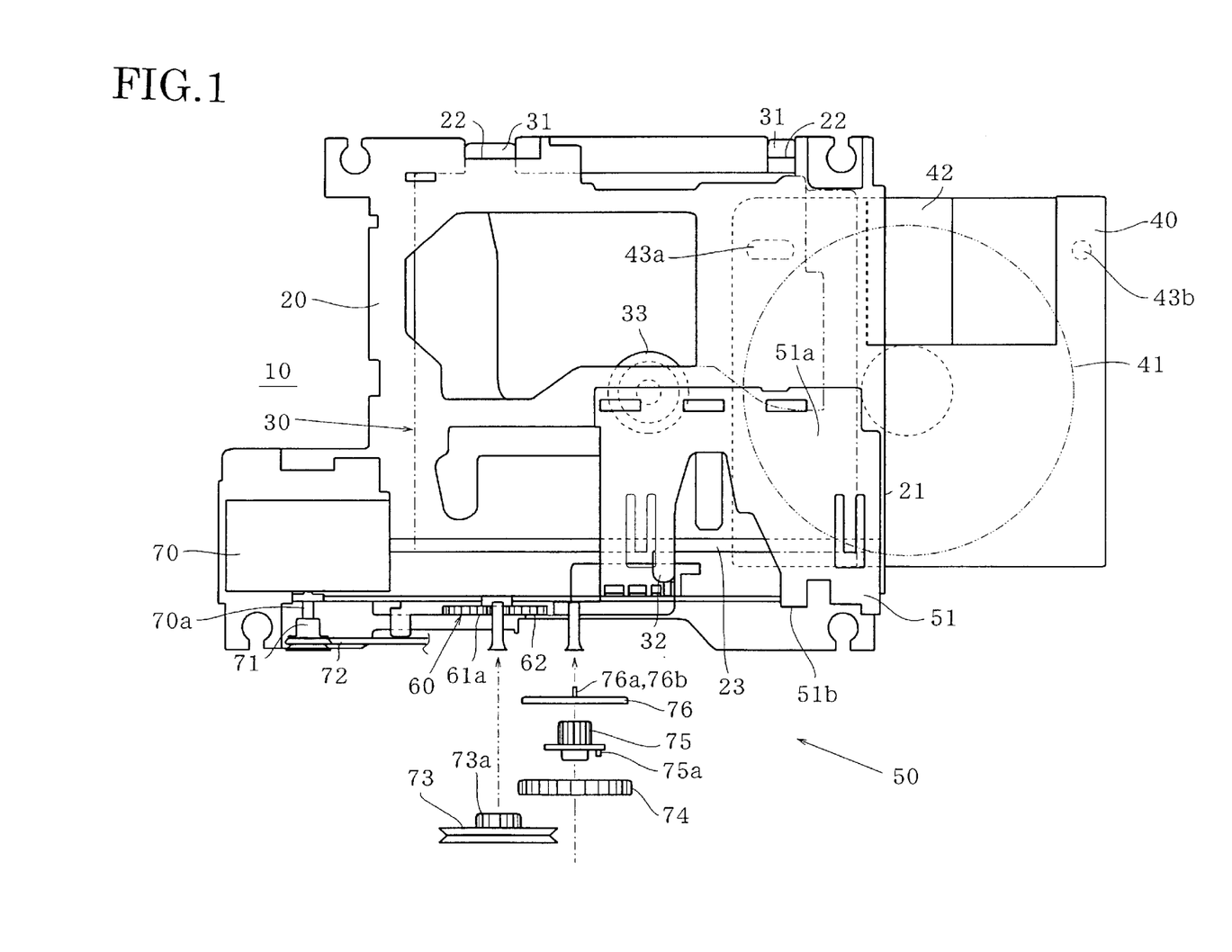
FIG. 1 is a front view schematically indicating a disc player equipped with a positioning system made according to a preferred embodiment of the present invention.
Figure 2:
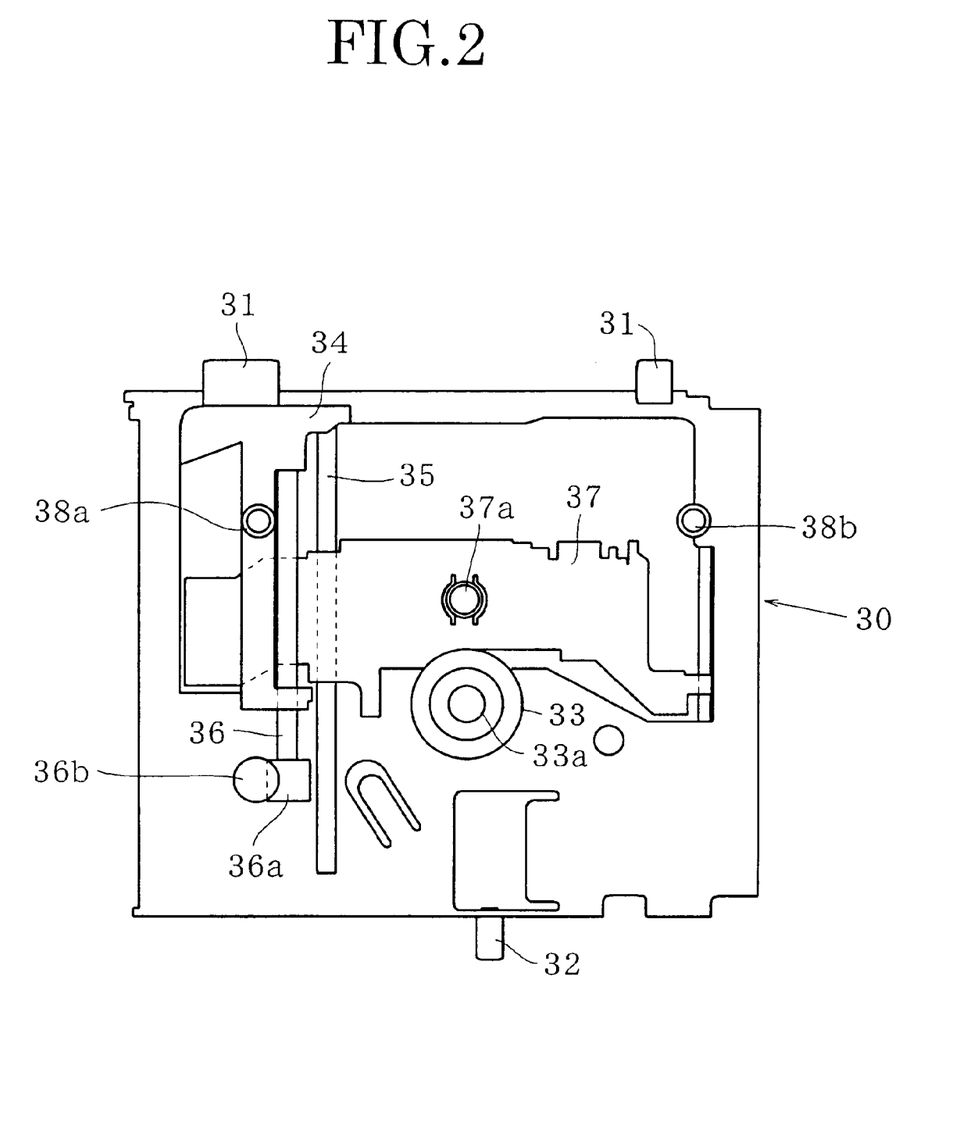
FIG. 2 is a front view schematically indicating a pivotable chassis used in the disc player of FIG. 1.
Figure 3:
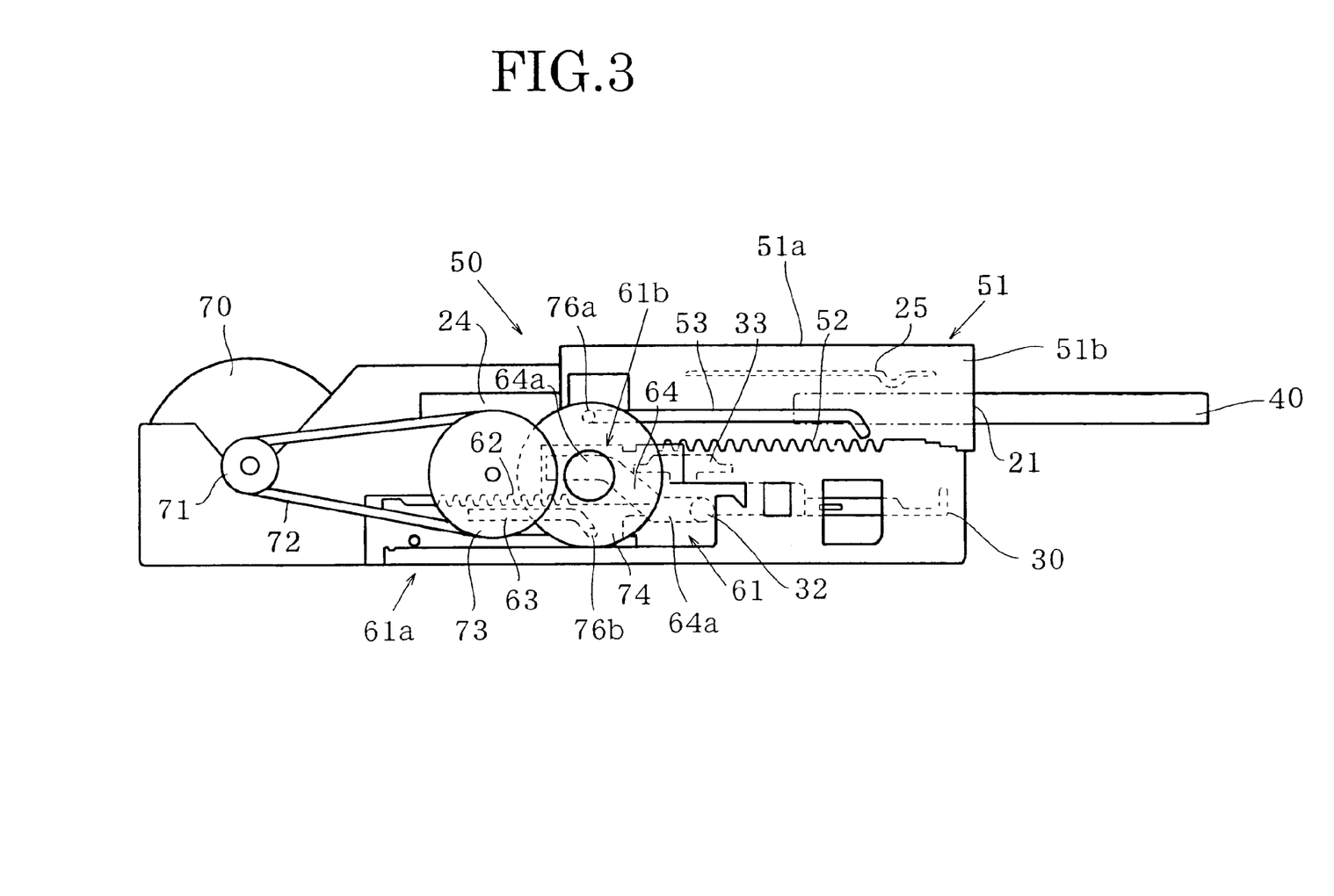
FIG. 3 is a side view schematically indicating the disc player of FIG. 1.
Figure 4:
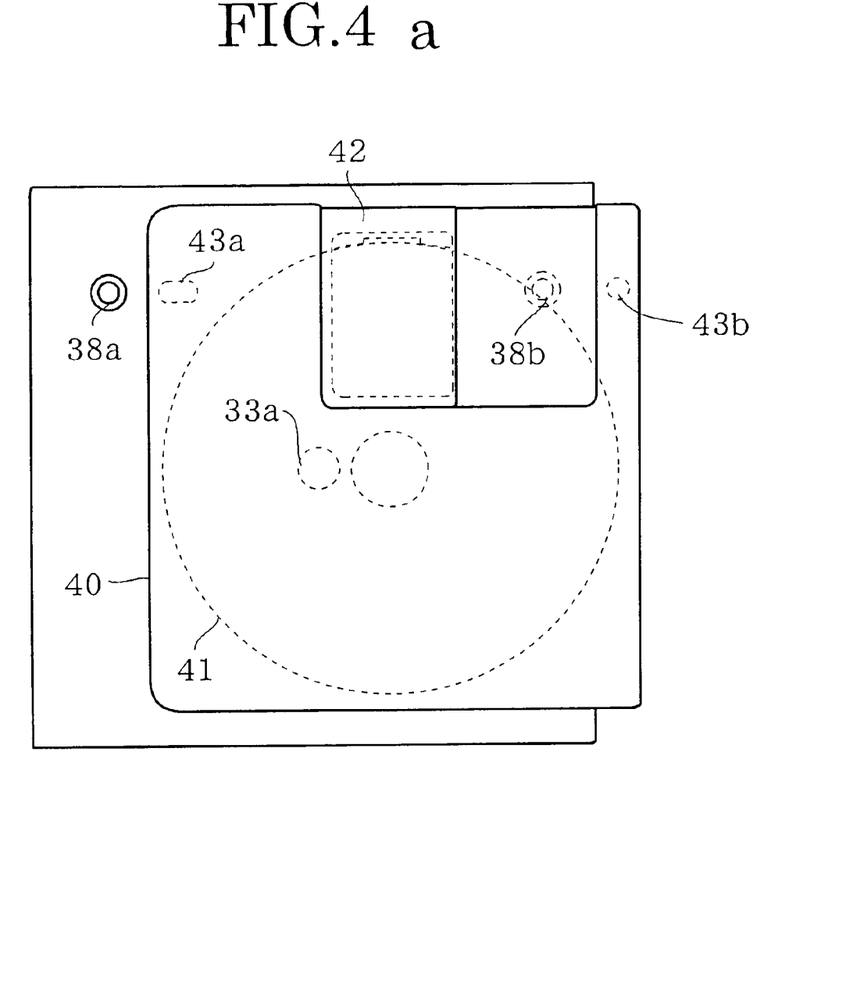
FIG. 4a is a front view schematically illustrating a first stage of a loading operation for inserting a disc cartridge into the disc player.
FIG. 4b is a cross sectional view schematically illustrating the first stage of the loading operation for inserting a disc cartridge into the disc player.
Figure 5:
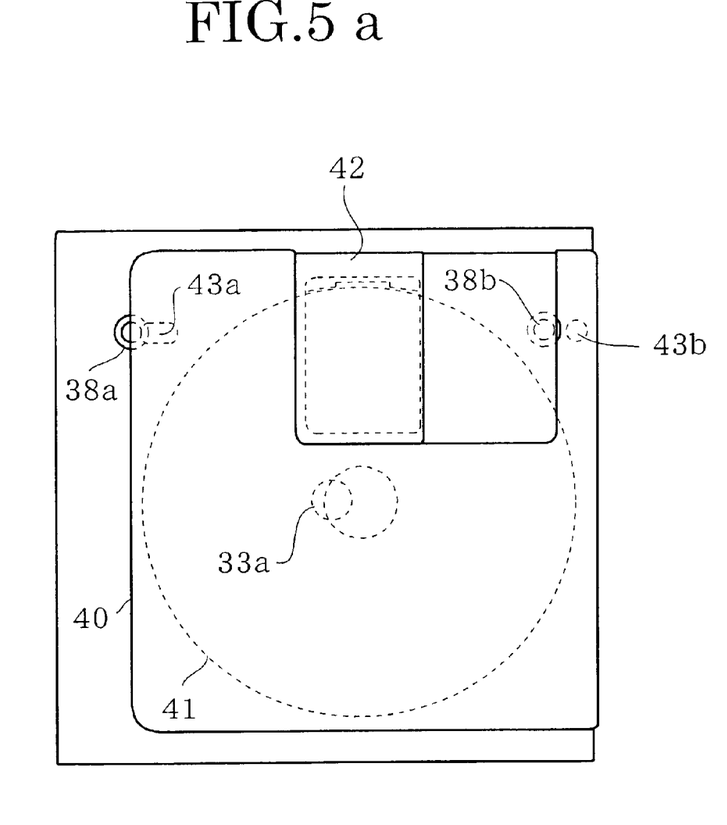
FIG. 5a is a front view schematically illustrating a second stage of the loading operation for inserting a disc cartridge into the disc player.
FIG. 5b is a cross sectional view schematically illustrating the second stage of the loading operation for inserting a disc cartridge into the disc player.
Figure 6:
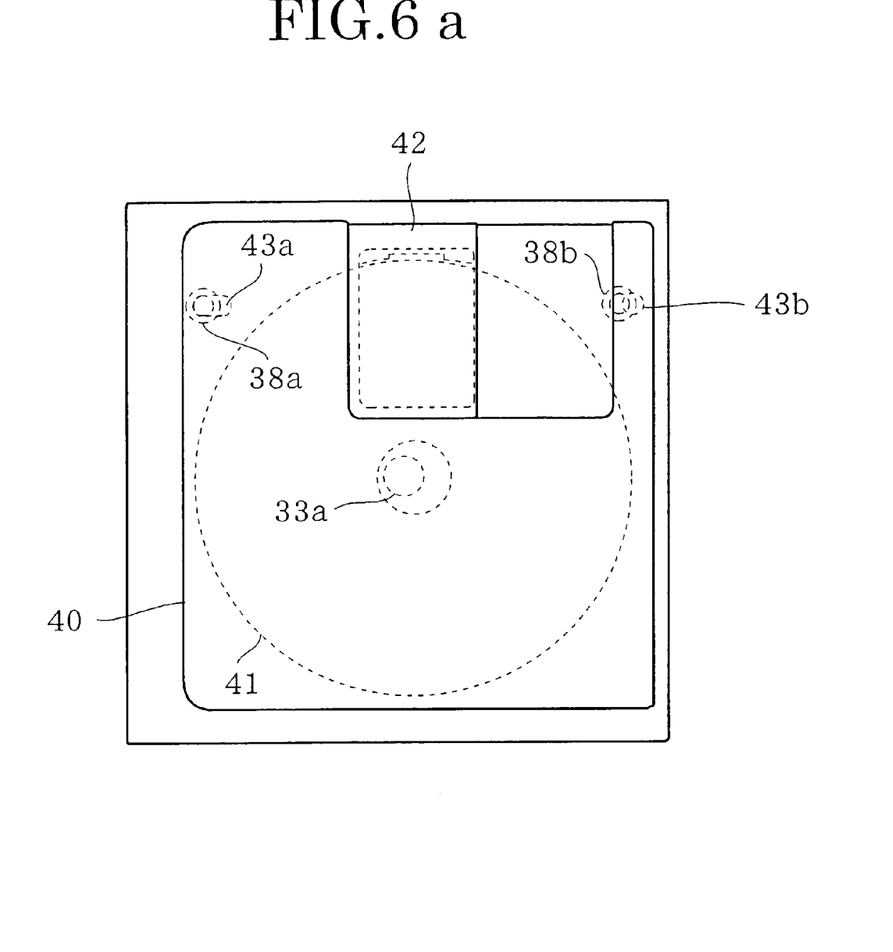
FIG. 6a is a front view schematically illustrating a third state of the loading operation for inserting a disc cartridge into the disc player.
FIG. 6b is a cross sectional view schematically illustrating the third stage of the loading operation for inserting a disc cartridge into the disc player.
Figure 7:
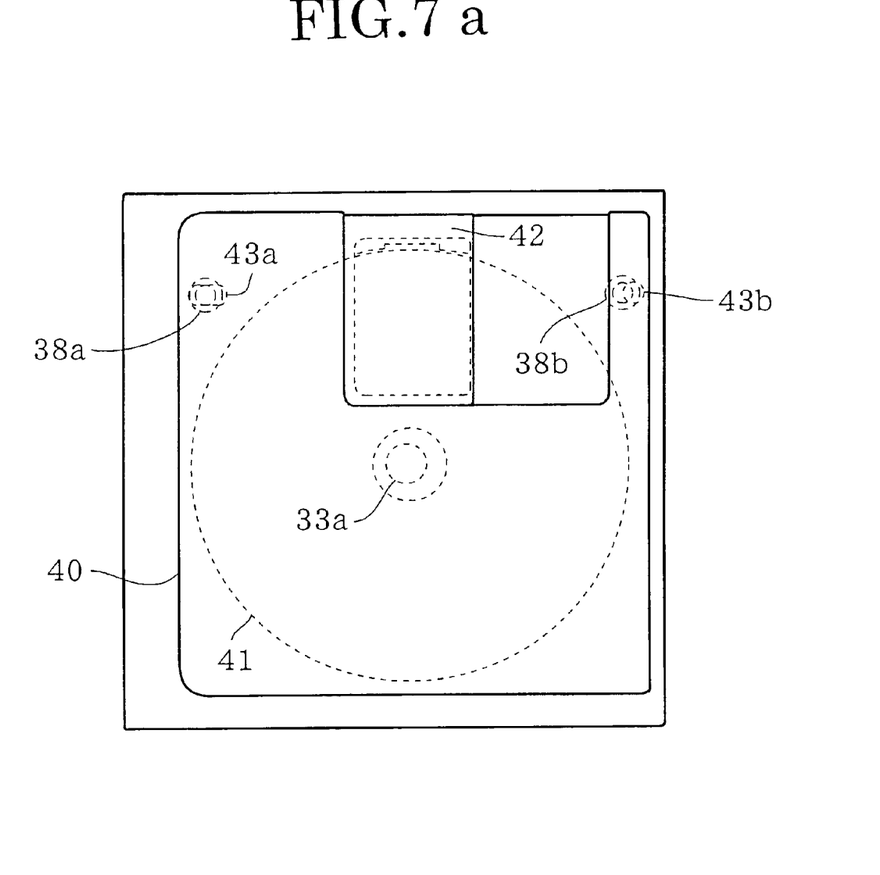
FIG. 7a is a front view schematically illustrating a fourth stage of the loading operation for inserting a disc cartridge into the disc player.
FIG. 7b is a cross sectional view schematically illustrating the fourth stage of the loading operation for inserting a disc cartridge into the disc player.
Figure 8:
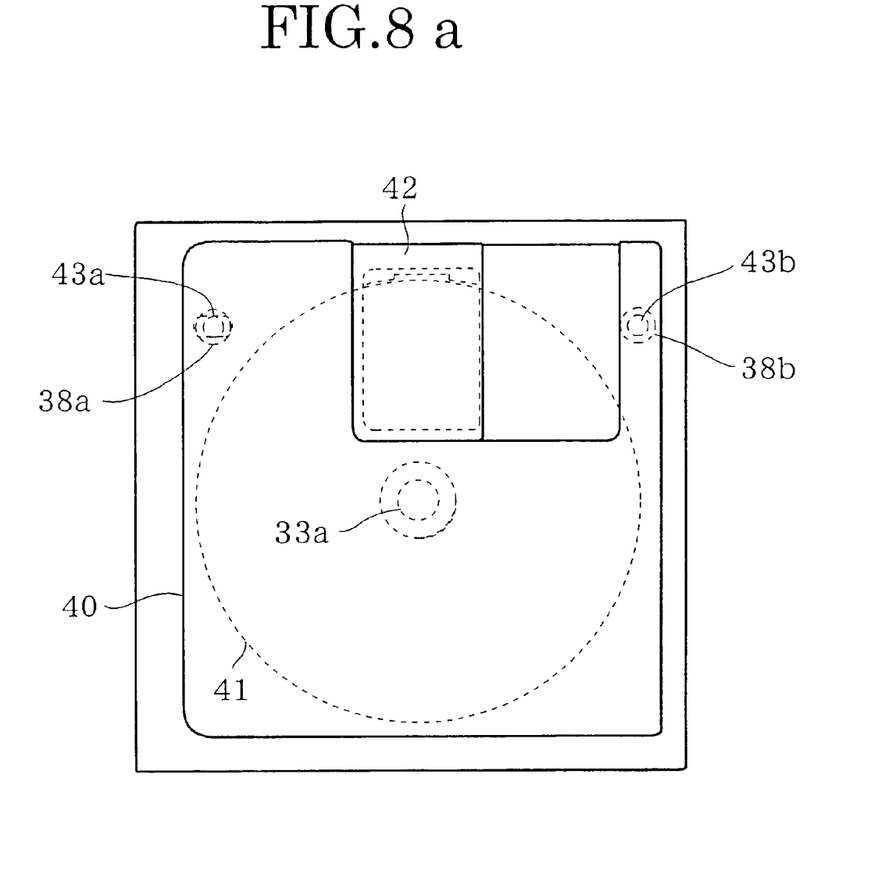
FIG. 8a is a front view schematically illustrating a fifth stage of the loading operation for inserting a disc cartridge into the disc player.
FIG. 8b is a cross sectional view schematically illustrating the fifth stage of the loading operation for inserting a disc cartridge into the disc player.

FIGS. 1–3 are explanatory views showing an information recording/reproducing apparatus such as a disc player made according to a preferred embodiment of the present invention. In FIG. 1, reference numeral 10, is used to represent a disc player which has a cartridge holder 20 for holding a cartridge 40. A pivotable chassis 30 is provided within the cartridge holder 40 in a manner such that it is pivotable about a pseudo pivoting axis extending along one side of the cartridge holder 20, as shown in FIG. 1. On the other side of the cartridge holder 20, there are provided a cartridge transporting system 50 for moving the cartridge 40, a driving system 60 for pivotably driving the pivotable chassis 30, a motor 70 for driving all of the above components.

In detail, the cartridge holder 20 is a frame structure having an elongated opening 21 on the front side thereof (on the right side in FIG. 1). The cartridge 40 having a generally rectangular shape capable of accommodating a disc-shaped recording medium 41 such as an optical disc, is allowed to be inserted into or taken out of the cartridge holder 20 through the elongated opening 21.

Further, a protection shutter 42 is provided on the cartridge 40 adjacent to one side thereof, in a manner such that the shutter 42 can be driven in the same direction as the cartridge 40 being inserted into or taken out of the cartridge holder 20.

Moreover, on one side of the cartridge 40 there are formed a first positioning hole 43a having a relatively large size and a second positioning hole 43b having a relative small size. The first and second positioning holes 43a, 43b are so formed that the positioning pins 38a and 38b (which will be described later) are allowed to engage thereinto.

Furthermore, on the above one side of the cartridge holder 20 there are formed a plurality of retaining grooves 22, so that a plurality of hinge members 31 of the pivotable chassis 30 may be engaged in these grooves 22 and supported thereon. In this way, the pivotable chassis 30 is allowed to pivot about the pseudo pivoting axis by virtue the hinge members 31.

FIG. 2 is a front view schematically indicating the pivotable chassis 30.

Referring to FIG. 2, the pivotable chassis 30 is also formed into a frame structure, a plurality of the hinge members 31 are outwardly protruding members integrally formed on one side of the pivotable chassis 30. With the hinge members 31 zinged in the remaining grooves 22 of the cartridge holder 20 (FIG. 1), the pivotable chassis 30 can pivot about the pseudo pivoting axis within the cartridge holder 20. On the other side of the pivotable chassis 30, there is provided an engaging pin 32 protruding outwardly in the same plane as the chassis main body.

A turntable 33 for turning a disc-shaped recording medium such as an optical disc 41 is provided on the center of the pivotable chassis 30. Such turntable 33 may be turned by a spindle shaft 33a of a spindle motor (not shown). Further, a guide shaft 35 and a worm gear 36 are mutually parallelly arranged on the rear portion of the pivotable chassis 30 by means of a fixing member 34, extending from one side of the chassis 30 to the other.

An optical pickup 37 is movably engaged through one side thereof with the worm gear 36 so as to be slidable on and along the guide shaft 35. Further, a rotating gear 36a and an engaging gear 36b, which are in a mutually engaged relation, are provided on the pivotable chassis 30 near the worm gear 36 and the guide shaft 35. A micro-type motor (not shown) provided on the chassis 30 is used to rotate the rotating gear 36a). With the rotation of the rotating gear 3a, the engaging gear 36b which is secured on one end of the worm gear 36, will be driven so that the optical pickup 37 can move reciprocatingly along the guide shaft 35. In FIG. 2, a reference numeral 37a is used to represent an objective lens.

A first positioning pin 38a engageable in the first positioning hole 43a formed on the cartridge 40 is provided on the fixing member 34. A second positioning pin 38b engageable in the second positioning hole 43b formed on the cartridge 40 is provided opposite to the first positioning pin 38a on the pivotable chassis 30.

The first positioning pin 38a is set to be somehow higher and larger than the second positioning pin 38b, so that when the cartridge 40 is inserted into the disc player 10, the first positioning pin 38a will be completely inserted in the first positioning hole 43a (which is relatively large in size than the second positioning hole 43b) earlier than an insertion of the second positioning pin 38b in the second positioning hole 43b. In addition, the first and second positioning pins 38a, 38b are each formed into a taper or hemispherical shape on the front end thereof. Further provided on the pivotable chassis 30 is a magnet head (not shown) which is movable up and down by virtue of a driving plate 61 (FIG. 3), as will be described in detail later.

Referring again to FIGS. 1 and 3, a cartridge transporting system 50 is used to move the cartridge 40 in a direction substantially parallel to the sliding direction of the shutter 42 on the cartridge 40. A carrier 51 is attached on the cartridge holder 20 in a manner such that it can move back and forth in the cartridge insertion direction. By virtue of such carrier 51, the cartridge 40 is allowed to smoothly move into and out of the cartridge holder 20.

In detail, the carrier 51 comprises a base plate 51a (FIG. 1) and a side plate 51b) (FIG. 3), forming an L-shaped configuration when viewed along the cartridge insertion direction. In fact, the carrier 51 is allowed to slide along an elongated groove 23 formed on the cartridge holder 20 extending in the cartridge insertion direction.

FIG. 3 is a side view of the disc player 10. As shown in FIG. 3, the side plate 51b is formed extending along the side face of the cartridge holder 20. Further, the side plate 51b joins a carrier locking means (not shown) and a carrier hooking means (not shown). The carrier locking means is used to lock the carrier 51 on the cartridge holder 20, in a manner such that once the cartridge 40 is inserted into the cartridge holder 20, a locked state will be released so that the carrier 51 is enabled to move in the cartridge insertion direction. On the other hand, the carrier hooking means is used to engage the cartridge 40 when it is being inserted into the cartridge holder 20.

As shown in FIG. 3, the side plate 51b of the carrier 51 is further formed with an elongated rack portion 52 in its longitudinal direction. Such rack portion 52 is allowed to engage with a driving gear 75 which will be explained in detail later.

Further, a guide groove 53 is formed in parallel with the elongated rack portion 52 on the side plate 51b, located between the elongated rack portion 52 and the above carrier locking means. As shown in FIG. 3, the guide groove 53 has a downwardly inclined front portion bending toward the rack portion 52. In detail, the guide groove 53 is so formed that it permits insertion of an upper pin 76a of a change-over ring 76, as shown in FIGS. 1 and 3.

Referring again to FIGS. 1 and 3, on the same side of the cartridge holder 20, there is provided a driving plate 61 which is movable back and forth in the cartridge insertion direction, partially serving as a driving mechanism 60 for driving the above pivotable chassis 30.

In detail, the driving plate 61 includes a driving portion 61a and an operating portion 61b. The driving portion 61a is formed with a rack portion 62 engageable with a driving gear 75 which will be described in detail later.

Further, under the rack portion 62 is formed a guide groove 63 which is in generally parallel with the rack portion 62. The guide groove 63 also has a downwardly inclined front portion. Another pin 76b (a lower pin) of the change-over ring 76 may be inserted in the guide groove 63.

On the inner surface of the operating portion 61b of the driving plate 61, there is formed a slightly Z-shaped guide groove 64. The engaging pin 32 of the pivotable chassis 30 is allowed to engage in the guide groove 64 so that said pin 32 may slide therealong. In this way, when the driving plate 61 is moving in its longitudinal direction, the pin 32 of the pivotable chassis 30 will be forced to move up and down in FIG. 3, thereby rendering the pivotable chassis 30 to pivot about the pseudo pivoting axis (FIG. 1), causing the chassis 30 to get in contact with or move away from a predetermined portion (not shown) within the cartridge holder 20.

In addition, a portion (not shown) of the driving plate 61 is so formed that it can serve to move the magnet head (not shown) attached on the pivotable chassis 30.

A driving motor 70, which serves to provide a driving force for the chassis driving system 60 (for driving the pivotable chassis 30) and for the cartridge transporting system 50, is provided on the rear position of the cartridge holder 20.

Referring to FIGS. 1 and 3, the motor 70 has a driving shaft 70a on which is secured a pulley 71. Another pulley 73 is secured on the side wall of the cartridge holder 20. A belt 72 is attached around both the pulley 71 and the pulley 73, so that a V-shaped belt contour is formed therebetween. Referring to FIG. 1, a small gear 73a integrally molded with the pulley 73 is engageable with a large gear 74 supported on the side wall of the cartridge holder 20.

Further, on the inner side of the large gear 74 is coaxially attached another gear 75 which is engageable with both the rack portion 52 formed on the side plate 51b of the carrier 51 and the rack portion 62 formed on the driving portion 61a of the driving plate 61. As shown in FIGS. 1 and 3, a change-over ring 76 having an upper pin 76a and a lower pin 76b is coaxially provided on the inner side of the gear In detail, the upper pin 76a of the change-over ring 76 is positioned such that it can be inserted in the guide groove 53 of the carrier 51, the lower pin 76b can be inserted in the guide groove 63 of the driving plate 61.

Formed on an inwardly recessed surface of the above gear 74 are two half-circumference grooves (not shown). The driving gear 75 is formed with a projection 75a which may movably engage in the half-circumference grooves and may be stopped by end faces in each of such grooves.

A flexible clamping member 25 (FIG. 3) is attached on the cartridge holder 20, so that a cartridge 40 inserted in the cartridge holder 20 may be fixedly supported thereon.

The operation of the disc player 10 having the above-discussed structure made according to the present invention will be described in detail below with reference to FIGS. 3–8.

Referring to FIG. 3, when a cartridge 40 (having the first positioning hole 43a and the second positioning hole 43b) is begun to be loaded into the cartridge holder 20 of the disc player 10, the carrier 51 is in a position adjacent to the right side (as viewed in FIG. 3) of the cartridge holder 20, while the driving plate 61 is in a position close to the left side (as viewed in FIG. 3) of the cartridge holder 20. At this time, the rack portion 52 of the carrier 51 is engaged with the driving gear 75, while the rack portion 62 of the driving plate 61 is not engaged with the driving gear 75.

At this moment, the upper pin 76a of the change-over ring 76 is in contact with the left end of the guide groove 53 of the carrier 51, while the lower pin 76b thereof is in contact with the lower end of the inclined portion of the guide groove 63 of the driving plate 61. In this way, the upper pin 76a and the lower pin 76b of the change-over ring 76 are contained in one pseudo line that is substantially perpendicular to the insertion direction of the cartridge 40.

Once the cartridge 40 is inserted into the cartridge holder 20 through the elongated opening 21 formed on the front side thereof, the locked state of the carrier 51 is released so that the carrier 51 becomes movable. Meanwhile, the above-mentioned hooking means (not shown) of the carrier 50 is caused to engage with an engaging hole formed on one side of the cartridge 40, so that the cartridge 40 and the carrier 51 become integrally movable.

Referring again to FIG. 1, at this time, the carrier 51 is moved along the guide groove 23 to the rear (left) of the cartridge holder 20, and this movement will cause a switch (not shown) to be turned ON, so as to cause the driving motor 70 to start its rotation.

Referring again to FIG. 1, with the rotation of the driving motor 70, a driving force is transmitted through the pulley 71, the bell 72, the gear pulley 73, the small gear 73a, the large gear 74, thereby rendering the driving gear 75 to start its rotation.

At this moment, since the upper pin 76a of the change-over ring 76 is still inserted in a horizontal portion of the guide groove 53 of the carrier 51, the change-over ring 76 does not rotate.

With the rotation of the driving motor 70, when the carrier 51 moves towards the rear side of cartridge holder 20, the upper pin 76a of the change-over ring 76 begins to slid from the horizontal portion of the guide groove 53 to the inclined front portion thereof. When the upper pin 76a moves along the inclined portion of the guide grooves 53, the upper pin 76a is caused to move in a circular trace in the counter clockwise direction. Meanwhile, the lower pin 76b of the change-over ring 76 is also caused to move in a circular trace in the counter clockwise direction, thereby forming a circular movement of the change-over ring 76 in the counter clockwise direction. In this way, since the lower pin 76b is caused to press against the inclined portion of the guide groove 63, the driving plate 61 is forced to move rightwardly as shown in FIG. 3. In this way, the rack portion 62 of the driving plate 61 becomes engaged with the driving gear 75, thereby rendering the driving plate 61 to move also in the rightward direction.

When the change-over ring 76 is caused to rotate further in the counter clockwise direction, with the above movement of the upper pin 76a, the rack portion 52 (of the carrier 51) engaged with the driving gear 75 will be disengaged from the driving gear 75, thereby rendering the movement of the carrier 51 to stop. At this moment, the upper pin 76a is in contact with the rightmost end of the guide groove 53, and the cartridge 40 has thus arrived at a predetermined position within the cartridge holder 20.

Afterwards, since the driving plate 61 is further moved rightwardly, the engaging pin 32 of the pivotable chassis 30 is started to move upwardly along the inclined groove 64 of the driving portion 61a of the driving plate 61. Upon this, the pivotable chassis 30 is caused to pivot with the supporting grooves 22 of the cartridge holder 20 as pivoting fulcrums. In this manner, the pivotable chassis 30 will pivot to an operating position within the cartridge holder 20 so as to catch the cartridge 40 while has already been inserted in the cartridge holder 20, with this positional relationship being kept by virtue of a pressing force produced by a clamping spring (not shown).

At this moment, since the first positioning pin 38a (to be inserted into the first positioning hole 43a) is higher and larger than the second positioning pin 38b (to be inserted into the second positioning hole 43b), and since the first positioning hole 43a is larger than the second positioning hole 43b, an insertion of the first pin 38a into the first positioning hole 43a will be earlier than the insertion of the second positioning pin 38b into the second positioning hole 43b.

In this way, since the insertion of the first pin 38a into a corresponding hole is earlier than that of the second pin 38b, the first pin 38a can provide a guide effect which enables the second positioning pin 38b to be more easily inserted into the second positioning hole 43b.

After the first and second positioning pins 38a, 38b have been respectively inserted into the positioning holes 43a, 43b, the pressing force produced by the clamp spring is then allowed to be released.

In the present specification, FIGS. 4a, 4b, 5a, 5b, 6a, 6b, 7a, 7b, 8a, 8b are used to schematically indicate a first stage through a fifth stage of the loading operation for inserting a disc cartridge 40 into the disc player 10.

Then, a switch (not shown) is turned OFF so that the driving motor 70 is stopped, thereby stopping the driving plate 61, thus, the disc-shaped recording medium 41 contained in the cartridge 40 may be reproduced, with the use of a reproducing system including the the optical pickup 37 and the turntable 33 which are all designed to operate in a predetermined manner.

When a sound information is to be recorded on the disc-shaped recording medium 41 contained within the cartridge 40, the driving motor 70 is again operated to cause the driving plate 61 to move further rightward. In this way, a non-illustrated portion of the driving plate 61 acts to move down the magnetic head on the pivotable chassis 30. This time, since the shutter 42 of the cartridge 40 has already been opened, the magnetic head is allowed to be mounted on the disc-shaped recording medium 41, thereby effecting a predetermined recording.

As can be understood from the above description of the preferred embodiment, with the use of the present invention, the disc cartridge 40 containing a disc-shaped recording medium 41 may be smoothly located in a correct position within the disc player, forming an improved positioning system for use in a disc player, thereby providing an improved disc player easy to operate without having to be very careful when inserting a disc cartridge.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A positioning system for use in an information recording/reproducing apparatus for positioning a cartridge containing an information recording medium on a chassis mounting information recording and/or reproducing means, said positioning system comprising:
   two positioning holes formed on the cartridge containing an information recording medium, with one positioning hole being larger than the other;
   two positioning pins formed on the chassis mounting information recording and/or reproducing means, with one positioning pin being higher than the other;
   means for positioning the cartridge such that when the cartridge containing the information recording medium is inserted into the recording/reproducing apparatus, the two positioning holes of the cartridge approach the chassis while keeping substantially the same distance from the chassis during the approach, with the higher positioning pin inserted into the larger positioning hole earlier than the insertion of the lower pin into the smaller positioning hole.

2. A positioning system for use in an information recording/reproducing apparatus for positioning a cartridge containing an information recording medium on a chassis mounting information recording and/or reproducing means, said positioning system comprising:
   two positioning holes formed on the cartridge containing an information recording medium, with one positioning hole being larger than the other;
   two positioning pins formed on the chassis mounting information recording and/or reproducing means, with one positioning pin being higher than the other; and
   a cartridge positioning system for positioning the cartridge such that when the cartridge containing the information recording medium is inserted into the recording/reproducing apparatus, the two positioning holes of the cartridge approach the chassis while keeping substantially the same distance from the chassis during the approach, with the higher positioning pin inserted into the larger positioning hole earlier than the insertion of the lower pin into the smaller positioning hole.

3. A positioning system according to claim 2, wherein said one of the positioning pins is larger in size than other positioning pin(s), and adapted to insert into a corresponding positioning hole which is also larger in size than other positioning hole(s).

4. A positioning system according to claim 2, wherein each of the positioning pins is formed into a taper or hemispherical shape.

5. A positioning system according to claim 2, wherein a plurality of positioning pins comprises a first positioning pin and a second positioning pin wherein said first positioning pin is larger than said second positioning pin.

6. A positioning system according to claim 5, wherein said first positioning pin is inserted into a corresponding positioning hole earlier than said second positioning pin into another corresponding positioning hole.

7. A positioning system according to claim 2, wherein during positioning of the cartridge into the chassis mounting information recording and reproducing means at a predetermined position within the recording/reproducing apparatus, a plurality of positioning holes formed on the cartridge approach the chassis at the same distance.

* * * * *